Figure 1:
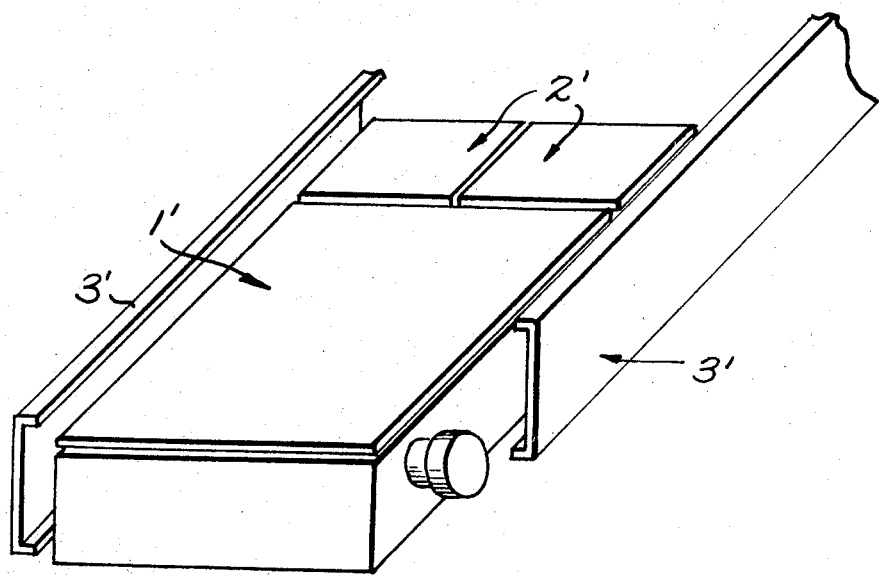

United States Patent [19]

Sawada et al.

[11] 3,869,028

[45] Mar. 4, 1975

[54] DOLLY USING A WARM-KEPT BATTERY AS ITS DRIVING POWER SOURCE

[75] Inventors: Yuji Sawada; Katsumi Takemoto; Yasuro Maruoka, all of Tokyo, Japan

[73] Assignee: Mitsubishi Jukogyo Kabushiki Kaisha, Tokyo, Japan

[22] Filed: Nov. 2, 1973

[21] Appl. No.: 412,139

[30] Foreign Application Priority Data
Nov. 2, 1972 Japan.................................. 47-12702

[52] U.S. Cl................... 191/1 R, 219/209, 191/1 R, 191/4, 191/45 R, 191/29 R
[51] Int. Cl.............................................. B60m 1/34
[58] Field of Search ........... 219/209, 202, 523, 526; 136/177, 178, 181; 191/1, 2, 3, 4, 12 R, 22 R, 29 R, 45 R, 49; 104/147 R, 148 R

[56] References Cited
UNITED STATES PATENTS
3,169,733  2/1965  Barrett................................. 191/29

3,469,072  9/1969  Carlson............................. 219/209

*Primary Examiner*—Lloyd L. King
*Assistant Examiner*—D. W. Keen
*Attorney, Agent, or Firm*—Cushman, Darby & Cushman

[57] ABSTRACT

A dolly using a warm-kept battery as its driving power source is described, which comprises a member for loading thereon an article to be conveyed and a shoe for feeding a required electric power from a trolley, and which is adapted to run along equipped rails for conveying said article, said dolly being characterized in that it is provided with a battery serving as a driving power source for said dolly which battery is covered by a heat insulating material and includes a heater associated with a thermostat and heated by an electric power fed from said trolley through said shoe, and plug portions which can be detachably engaged with members for forcibly discharging hydrogen gas produced upon charging said battery.

1 Claim, 6 Drawing Figures

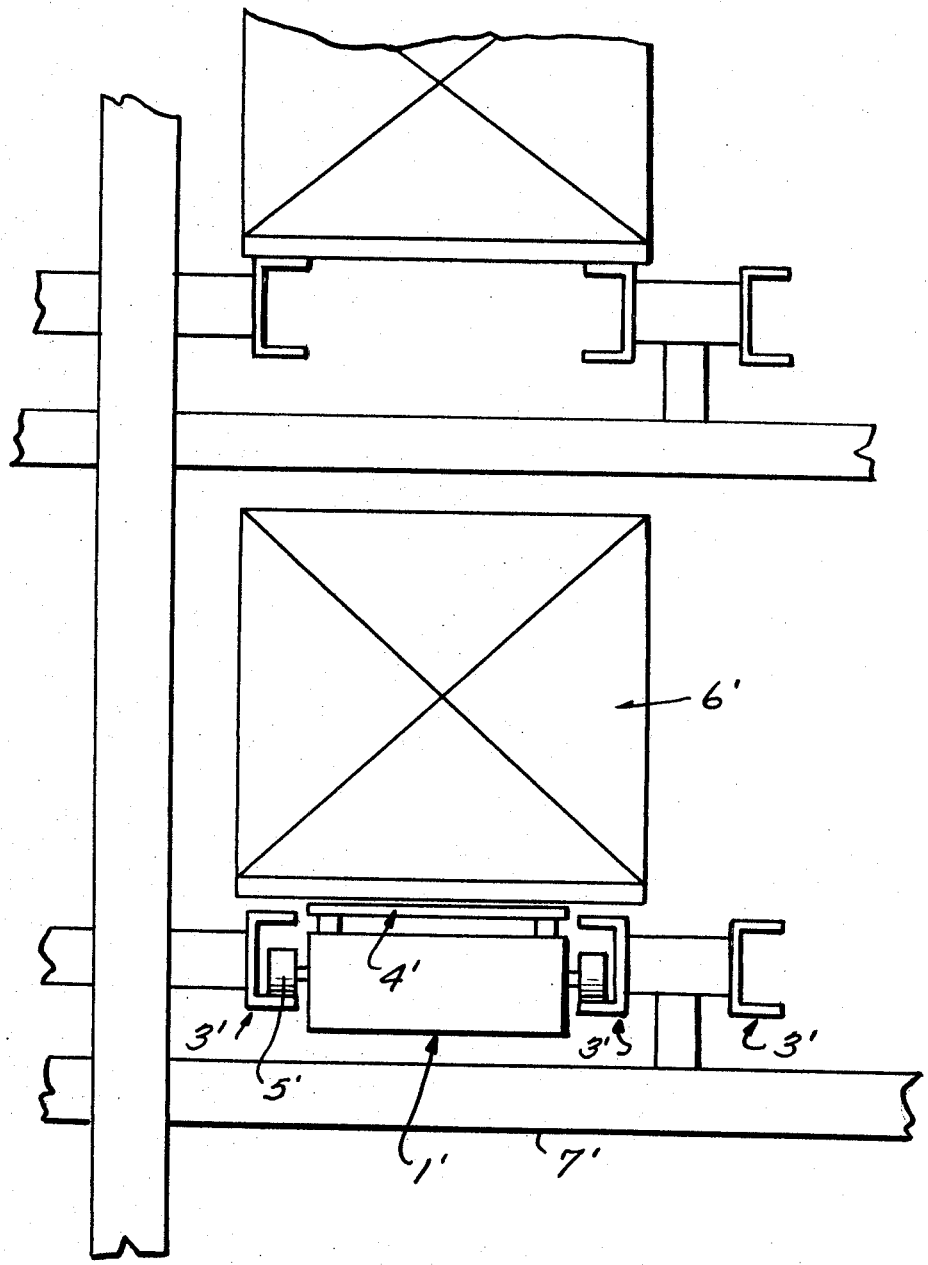

DOLLY USING A WARM-KEPT BATTERY AS ITS DRIVING POWER SOURCE

The present invention relates to a dolly using a warm-kept battery as its driving power source.

Heretofore, upon cargo work within a refrigerated warehouse it has been necessary that the workers themselves enter directly into the refrigerated warehouse because said cargo work has been carried out by hand-work or with a fork-lift, so that in view of the ambient temperature for the work it has been strongly desired to improve the working condition and mechanization has been developed in various modes for adapting to this end.

One of the improved system employs a dolly (provided with a battery serving as its driving power source) which was already practically used in an automatic warehouse at a normal temperature. In case that a dolly is used in an automatic warehouse, the dolly is led to an opening of a tunnel-shaped rack for conveying an article (cargo), which has been already brought to said opening from an external station by means of a stacker crane, towards a deep position of said rack, and thus carries out the warehousing work, or on the contrary, the cargo is conveyed from the deep position of the rack to the opening with said dolly and then brought out from the opening to the external station by means of the stacker crane, and thus the delivery work is carried out. This dolly is loaded with a battery for supplying a driving electric power and transmitting signals which are necessary upon warehousing and delivery in the operation as described above.

In case that the aforementioned dolly using a battery as its driving power source is employed as a cargo conveying apparatus in a refrigerated warehouse, it could not be fully useful in practice because of the following shortcomings:

1. The operable period of the dolly is reduced because of the decrease in capacity of the battery under a reduced temperature.
2. The battery must be frequently replaced because of Item (1) above.
3. Owing to the deterioration of the charging characteristics of the battery under a reduced temperature, it is necessary to charge for a long time with a reduced charging current, or else the charging per se is impossible at the temperature within a refrigerated warehouse, and thus it is required to provide a charging station in a separate room maintained at a normal temperature. In this case, it was necessary to provide a plurality of batteries for a single dolly so that they may be replaced during the period of charging.

The aforementioned shortcomings are all caused by lowering temperature of the electrolyte in the battery, and this is explained on the following grounds:

a. Diffusion of electrolyte is deteriorated, and thereby chemical reactions become inactive.

b. An electric resistance through the electrolyte is increased, and also an electro-motive-force is reduced.

c. A loss during the period of charging (an ineffective part — the part mainly used for producing a gas) is large.

Therefore, it is an object of the present invention to provide an improved dolly using a warm-kept battery as its driving power source which is free from the above-described shortcomings in the prior art dollies.

According to the present invention, the battery serving as a driving power source of the dolly is maintained at a normal temperature by heat insulation and heating whereby a long time operation of the dolly within a refrigerated warehouse may be made possible, also charging of the battery within a refrigerated warehouse is made possible to eliminate the necessity for frequent replacement of the battery, and further upon charging to be carried out after completion of the work, hydrogen gas produced during the charging process is forcibly discharged out of the warehouse by means of a hydrogen gas exhaust pipe and an air intake pipe to prevent the danger of explosion; and the present invention is applicable not only to a dolly to be used in a refrigerated warehouse having a tunnel-shaped rack, but also to an attendantless conveying track within a refrigerated warehouse and the like.

Figure 3:
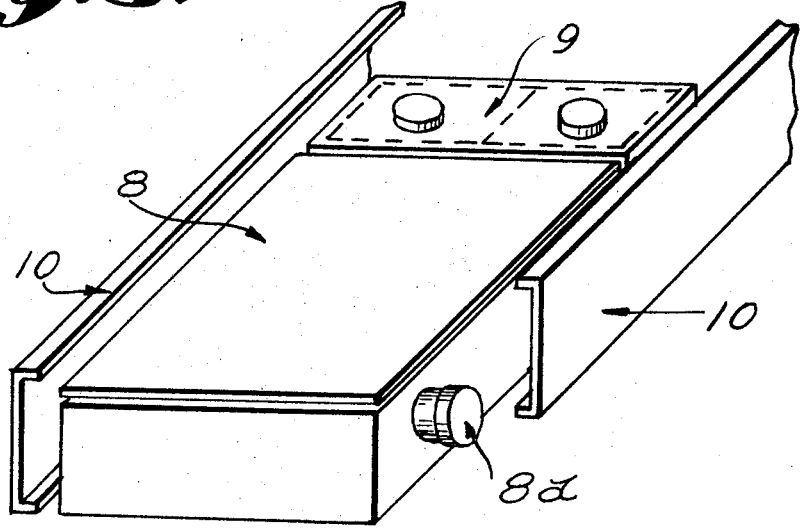
Figure 4:
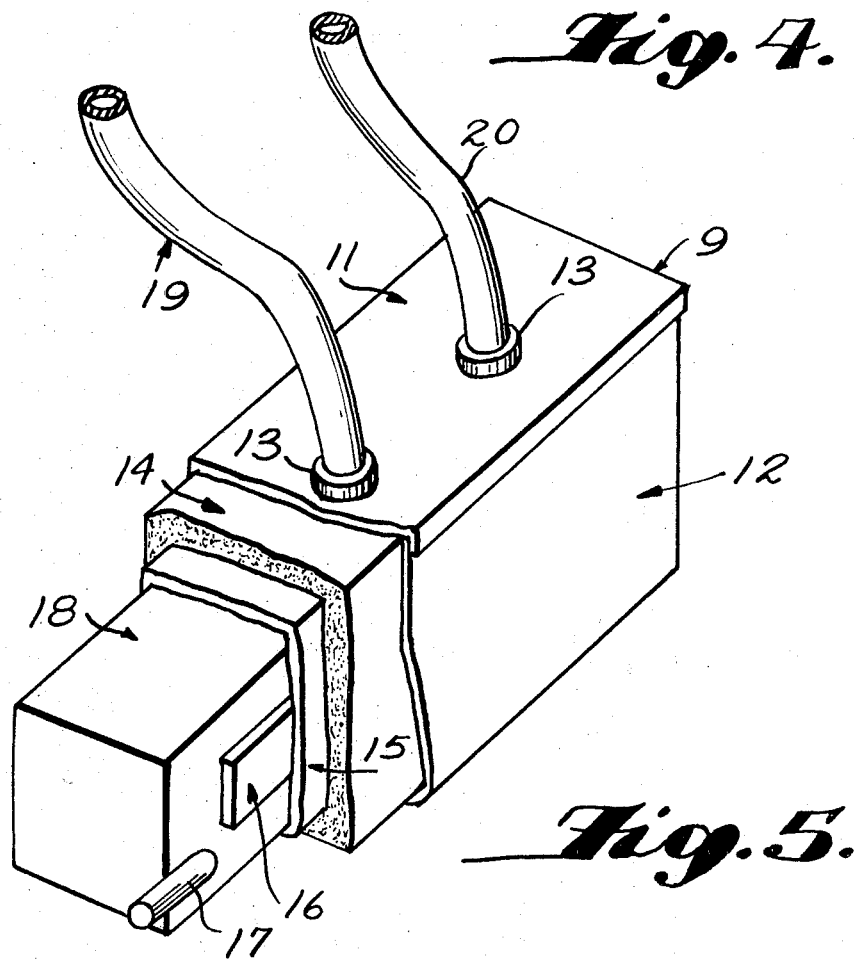
Figure 5:
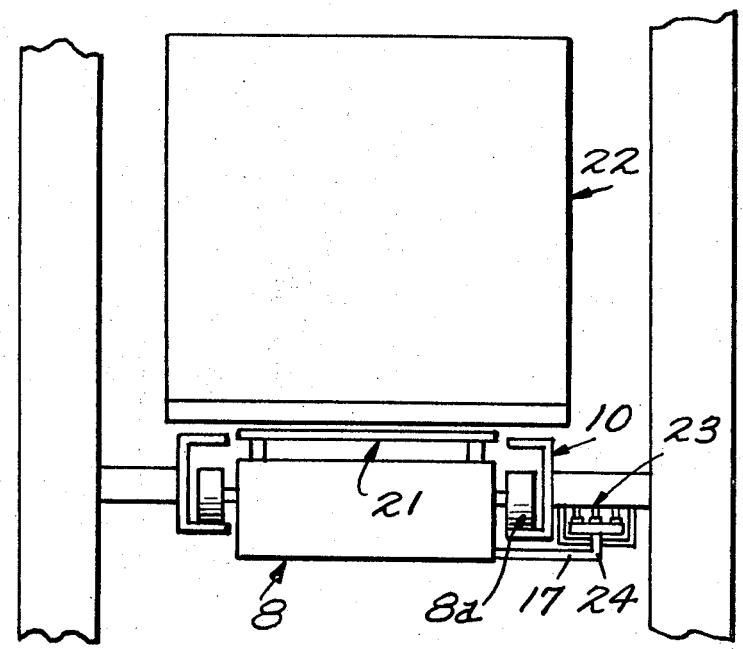
Figure 6:
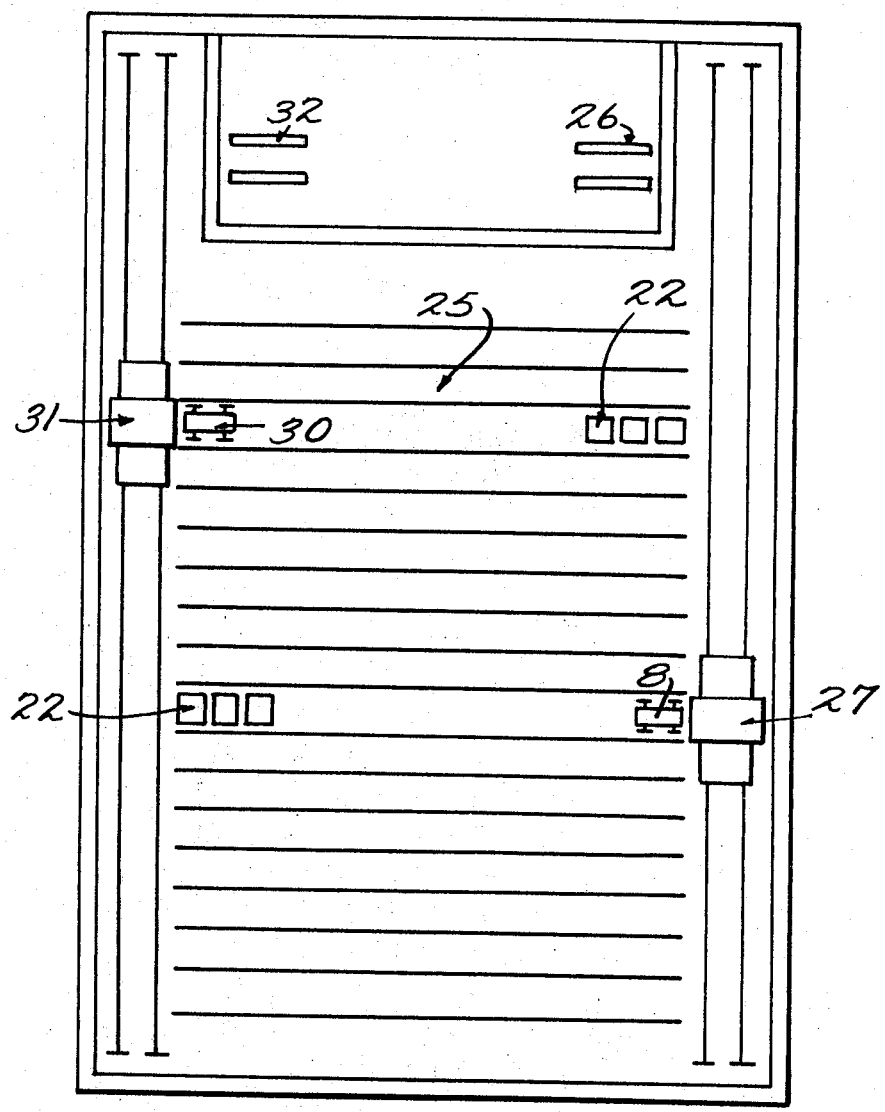

These and other objects, features and advantages of the present invention will become more apparent with reference to the following description of its preferred embodiment taken in conjunction with the accompanying drawings, in which:

FIG. 1 is a perspective view of a dolly in accordance with the prior art,

FIG. 2 is a front elevation view showing the configuration of an opening within a refrigerated warehouse according to a dolly system in the prior art, FIG. 3 is an outside perspective view of a dolly according to the present invention, FIG. 4 is a perspective view partly cut away of a battery section in the dolly shown in FIG. 3, FIG. 5 is a front elevation view showing an electric power feeding system for the heater in the dolly according to the present invention as it is located at its home position, and FIG. 6 is a schematic view for explaining operation of the system upon warehousing and delivery of articles within a reduced temperature refrigerated automatic warehouse by means of the dolly according to the present invention.

Before going into a detailed description of the illustrated embodiment of the present invention, a construction of one example of dolly conveying systems in the prior art will be described with reference to FIGS. 1 and 2.

In FIG. 1 which shows a construction of a dolly in the prior art, reference numeral 1' designates a main body of the dolly, numeral 2' designates batteries, and numeral 3' designates rails which serve as a runway for the dolly as well as a rack frame for supporting cargoes thereon.

In FIG. 2 which shows a configuration of an opening within a dolly type of automatic warehouse in the prior art, reference numeral 1' designates a main body of the dolly which contains therein driving means and control means for causing the dolly to run and a loading table 4' to rise and fall. Reference numeral 3' designates, similarly to FIG. 1, rails serving as a runway for the dolly as well as a rack frame for supporting cargoes thereon, numeral 5' designates wheels for running, numeral 6' designates an article loaded on the loading table 4' of the dolly, and numeral 7' designates a skeleton of a rack.

The dolly conveying system in the prior art as illustrated in FIGS. 1 and 2 had a disadvantage that it could not be satisfactorily operated in a refrigerated warehouse from the reasons as described in the beginning of this specification. However, it is to be noted that the embodiment of the present invention as illustrated in FIGS. 3 to 7 and described in more detail hereinafter is constructed starting from the basic structure in the prior art shown in FIGS. 1 and 2 with improvements to the battery structure therein.

Now the present invention will be described with reference to FIG. 3 (a perspective view of a dolly according to the present invention), FIG. 4 (a battery section), FIG. 5 (a power feeding system for a heater in the battery) and FIG. 6 (one example of reduced temperature refrigerated automatic warehouses employing the dolly according to the present invention).

In FIG. 3, reference numeral 8 represents a main body of a dolly (numeral 8a representing wheels for running), numeral 9 represents a battery section (the details being illustrated in FIG. 4), and numeral 10 represents rails of channel type serving as a runway for the dolly (also serving as a rack frame on which articles are loaded).

In FIG. 4 which shows the structure of the above-referred warm-kept battery section 9, reference numeral 11 designates a top cover plate, numeral 12 designates a casing beneath said top cover plate, numeral 13 designates plugs for discharging hydrogen gas, numeral 14 designates a heat insulating material, numeral 15 designates a moisture shielding layer, numeral 16 designates a heater, numeral 17 designates a thermostat, numeral 18 designates a chargeable battery, numeral 19 designates a hydrogen gas exhaust pipe, and numeral 20 designates an air intake pipe, said hydrogen gas exhaust pipe 19 and said air intake pipe 20 being coupled to the chargeable battery 18 via said gas discharging plugs 13 when connected to said gas discharging plugs 13.

In FIG. 5 which shows an electric power feeding system for said heater 16 at the home position of the dolly, reference numeral 8 designates a main body of dolly which is also represented by the same reference numeral in FIG. 3, that is, a main body containing therein driving means and control means for causing the dolly to run and an article loading table 21 to rise and fall, and the structure of said dolly is the same either in the case of a warehousing dolly or in the case of a delivery dolly as fully described hereinafter.

Reference numeral 10 designates rails serving as a runway for the dolly which is also represented by the same reference numeral in FIG. 3, numeral 22 designates an article loaded on the loading table 21, numeral 23 designates a trolley (for feeding the dolly 8 a necessary electric power as well as a necessary signal), and numeral 24 designates a shoe (for receiving the necessary electric power as well as the necessary electric signal from the trolley 23 and feeding the same to the dolly 8).

More particularly, the battery 18 having its entire surface covered by a heat insulating material 14 and a moisture shielding layer 15 under said heat insulating material as shown in FIG. 4, is adapted to be prevented from temperature lowering by maintaining its ambient temperature always at a predetermined temperature with the operation of the heater 16 provided on the side surface of the battery and the thermostat 17 (the power feeding system therefor being described later), whereby a long time operation as well as charging of the battery within a refrigerated warehouse may be made possible.

As the electric power feeding system for the heater 16, is employed a trolley-shoe feeding system to achieve automatic heating. More particularly, as shown in FIG. 5, the shoe 24 disposed on one side of the dolly 8 is connected to the heater 16 and the thermostat 17 shown in FIG. 4, and thereby the interior of the battery 18 is adapted to be maintained at a predetermined temperature with an A.C. current fed through the trolley 23 during the period when the dolly 8 is located at its home position.

With regard to the charging of the battery, as fully described later with reference to FIG. 6, it is carried out after a daily work has been finished, and provision is made such that the hydrogen gas produced during the period of charging may be forcibly discharged from the interior of the battery to the outside of the refrigerated warehouse by fitting the exhaust pipe 19 and the air intake pipe 20 to the hydrogen gas discharging plugs 13 (which are normally closed without being connected to said both pipes 19 and 20 during the operation of the dolly).

Now one example of operation with a reduced temperature refrigerated automatic warehouse employing the dolly loaded with the above-described warm-kept battery, will be described with reference to FIG. 6.

I. In case of Warehousing:

Reference numeral 25 designates a multi-level, multi-channel rack within a refrigerated warehouse.

1. When an article (cargo) 22 has arrived at a warehousing station 26, at first a warehousing stacker crane 27 moves to said warehousing station 26, where said article 22 is drawn into the warehousing stacker crane 27 by an operation of a chain conveyor (not shown) provided within said warehousing stacker crane 27.

2. Nextly, the warehousing stacker crane 27 runs and rises up to a predetermined opening of the rack 25 while carrying therein the warehousing dolly 8 (having a warm-kept battery loaded thereon) and the article 22 loaded on its loading table 21.

3. Then, the warehousing dolly 8 enters into the rack 25 while having the article 22 loaded thereon, and travels towards the delivery side until it detects the preceding cargo by means of a sensing device such as, for example, a limit switch, when it automatically stops, and after placing said loaded article 22 on the dolly rails 10 which also serves as a rack frame for loading cargoes, it travels back to the initial position.

4. In the next, the warehousing dolly 8 which has returned to the initial position, directly enters into the warehousing stacker crane 27 waiting at the opening on the warehousing side of the rack 25.

5. Thereafter, the warehousing stacker crane 27 goes back to the warehousing station 26 for receiving the next article 22 to be conveyed. Thus, the warehousing stacker crane 27 is adapted to continue the warehousing work by repeating the operations (1) to (5) above.

6. Within the warehousing stacker crane 27 is provided a trolley duct, so that during the period when the warehousing dolly 8 is located on the warehousing stacker crane 27, an electric current is fed to the heater 16 for the battery 18 through the shoe 24 in the above-described manner to prevent temperature lowering of the battery 18.

7. After a daily work has been finished, the warehousing stacker crane 27 stops at the warehousing station 26 while accommodating the warehousing dolly 8 therein, the hydrogen gas exhaust pipe 19 and the air intake pipe 20 equipped in the neighborhood of the station 26 are respectively fitted to the hydrogen gas discharging plugs 13 in the battery section 9, and thereby the charging of the battery 18 can be carried out, while forcibly discharging the hydrogen gas produced during the period of charging, outside of the warehouse.

II. In Case of Delivery:

1. A delivery stacker crane 31 runs and rises up to a predetermined opening on the delivery side of the rack 25 while accommodating therein a delivery dolly 31 (its structure being the same as the warehousing dolly 8, and having a warm-kept battery loaded thereon).

2. Said delivery dolly 30 transfers from the stacker crane 31 to the rack 25, and then travels towards the warehousing side until it detects the front-most cargo by means of a sensing device such as, for example, a limit switch and the like, when it automatically stops just beneath the article 22 to be loaded thereon, and after it has said article 22 loaded thereon it returns to the end on the delivery side.

3. The delivery dolly 30 directly enters into the delivery stacker crane 31 waiting on the delivery side of the rack 25 while it has the article 22 loaded thereon.

4. Then, the delivery stacker crane 31 moves to a delivery station 32.

5. A chain conveyor (not shown) provided within the delivery stacker crane 31 operates to transfer the loaded article 22 onto the delivery station 32.

6. Thereafter, the delivery stacker crane 31 runs and rises up to a predetermined opening on the delivery side of the rack 25 to deliver the next stored article 22.

7. The delivery work is continued by repeating the operations (1) to (6) above.

8. Within the delivery stacker crane 31 is provided a trolley duct, so that during the period when the delivery dolly 30 is located on the delivery stacker crane 31, an electric current is fed to the heater for the battery through the shoe to prevent temperature lowering of the battery.

9. Then similarly to the case of the above-described warehousing dolly, after a daily work has been finished, the delivery stacker crane 31 stops at the delivery station 32 while accommodating the delivery dolly 30 therein, the hydrogen exhaust pipe and the air intake pipe equipped in the neighborhood of the station 32 are respectively fitted to the hydrogen gas discharging plugs in the battery, and thereby the charging of the battery can be carried out, while forcibly discharging the hydrogen gas produced during the period of charging, outside of the warehouse.

According to the present invention, as described in detail above with reference to its preferred embodiment, a dolly which comprises a member for loading thereon an article to be conveyed and a shoe for feeding a required electric power from a trolley and which is adapted to run along equipped rails for conveying said article, is further provided with a battery serving as a driving power source for said dolly which battery is covered by a heat insulating material and includes a heater associated with a thermostat and heated by an electric power fed from said trolley through said shoe, and therefore, (1) according to the present invention the battery serving as a driving power source can be maintained always at a normal temperature as heated by said heater and thermally insulated by said heat insulating material, so that upon employing said dolly as a conveying machine for cargo work within a refrigerated warehouse and the like, the capacity reduction of the battery under a reduced temperature as encountered in the prior art would never occur, and accordingly a long time operation of the dolly within a refrigerated warehouse and the like becomes possible because there is no need to frequently replace the battery as is the case with the prior art.

In addition, according to the present invention, the plug portions provided in the dolly can be detachably engaged with members for forcibly discharging hydrogen gas produced upon charging said battery (for instance, a hydrogen gas exhaust pipe and an air intake pipe), and therefore, (2) upon completion of the work the charging of the battery can be easily performed, with the hydrogen gas produced during the period of charging being forcibly discharged outside of the warehouse by connecting said members for forcibly discharging said hydrogen gas to said plug portions, and thus the danger of explosion can be prevented.

What we claim is:

1. A dolly using a warm-kept battery as its driving power source, which comprises a member for loading thereon an article to be conveyed and a shoe for feeding a required electric power from a trolley, and which is adapted to run along equipped rails for conveying said article; characterized in that said dolly is provided with a battery serving as a driving power source for said dolly which battery is covered by a heat insulating material and includes a heater associated with a thermostat and heated by an electric power fed from said trolley through said shoe, and plug portions which can be detachably engaged with members for forcibly discharging hydrogen gas produced upon charging said battery.

* * * * *